United States Patent
Kakiuchi et al.

(10) Patent No.: US 8,324,852 B2
(45) Date of Patent: Dec. 4, 2012

(54) MOTOR POSITION DETECTING METHOD, MOTOR DRIVING UNIT, AND PUMP

(75) Inventors: Yohei Kakiuchi, Takasago (JP); Takeshi Okubo, Takasago (JP); Yasuharu Yamamoto, Takasago (JP); Tatsuya Hidaka, Takasago (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 347 days.

(21) Appl. No.: 12/673,429

(22) PCT Filed: Jan. 15, 2009

(86) PCT No.: PCT/JP2009/050436
§ 371 (c)(1),
(2), (4) Date: Feb. 12, 2010

(87) PCT Pub. No.: WO2009/090986
PCT Pub. Date: Jul. 23, 2009

(65) Prior Publication Data
US 2011/0175561 A1    Jul. 21, 2011

(30) Foreign Application Priority Data
Jan. 15, 2008 (JP) .................................. 2008-006051

(51) Int. Cl.
*H02K 29/12* (2006.01)
(52) U.S. Cl. .............. 318/400.37; 318/400.01; 318/630; 318/700; 310/68 B
(58) Field of Classification Search ............ 318/400.01, 318/400.37, 700, 630; 340/682; 324/207.15; 310/68 B, 12.24
See application file for complete search history.

(56) References Cited

U.S. PATENT DOCUMENTS

| | | | | |
|---|---|---|---|---|
| 4,553,075 A * | 11/1985 | Brown et al. | ............ | 318/400.01 |
| 6,053,705 A | 4/2000 | Schoeb et al. | | |
| 6,144,126 A * | 11/2000 | Kodama | ...................... | 310/68 B |
| 6,368,075 B1 | 4/2002 | Fremerey | | |
| 6,603,304 B2 * | 8/2003 | Sekine | ...................... | 324/207.15 |
| 6,836,032 B2 * | 12/2004 | Vaknin | ...................... | 310/12.24 |
| 7,019,661 B2 * | 3/2006 | Misato | ...................... | 340/682 |
| 7,443,044 B2 * | 10/2008 | Shimazaki et al. | ......... | 290/38 R |
| 7,746,064 B2 | 6/2010 | Knorr et al. | | |

(Continued)

FOREIGN PATENT DOCUMENTS

DE    102004046824 A1    4/2006

(Continued)

OTHER PUBLICATIONS

DE Office Action for 112009000098.3 dated Aug. 30, 2011.

(Continued)

*Primary Examiner* — Paul Ip
(74) *Attorney, Agent, or Firm* — Kanesaka Berner & Partners LLP

(57) ABSTRACT

It is an object to detect the axial position of a rotor without using a sensor. A method for detecting the position of a motor including a rotor and a stator around which armature windings of a plurality of phases are wound is provided, wherein a position detecting coil is disposed on one axial end face of a stator core, an induced voltage generated in the position detecting coil is detected, and the axial position of the rotor is detected on the basis of the detection result.

4 Claims, 9 Drawing Sheets

U.S. PATENT DOCUMENTS

| | | | |
|---|---|---|---|
| 2002/0059038 A1* | 5/2002 | Sekine | 702/94 |
| 2003/0155884 A1* | 8/2003 | Witzig | 318/700 |
| 2003/0187321 A1 | 10/2003 | Hoffmann et al. | |
| 2004/0095026 A1* | 5/2004 | Vaknin | 310/12 |
| 2005/0012630 A1* | 1/2005 | Misato | 340/682 |
| 2007/0284888 A1* | 12/2007 | Shimazaki et al. | 290/38 |

FOREIGN PATENT DOCUMENTS

| | | |
|---|---|---|
| JP | 1308143 A1 | 12/1989 |
| JP | 11148819 A | 6/1999 |
| JP | 2000502420 A1 | 2/2000 |
| JP | 2002153018 A | 5/2002 |
| JP | 2003525561 A | 8/2003 |
| JP | 200687298 A | 3/2006 |

OTHER PUBLICATIONS

ISR for PCT/JP2009/050436 mailed Apr. 14, 2009.
Office Action for JP2008006051 mailed May 15, 2012.
Decision to Grant a Patent Issued for JP 2008-006051, issued Aug. 28, 2012.

* cited by examiner

MOTOR POSITION DETECTING METHOD, MOTOR DRIVING UNIT, AND PUMP

RELATED APPLICATIONS

The present application is national phase of PCT/JP2009/050436 filed Jan. 15, 2010, and claims priority from Japanese Application Number 2008-006051, filed Jan. 15, 2008, the disclosures of which are hereby incorporated by reference herein in their entirety.

TECHNICAL FIELD

The present invention relates to a brushless motor and, in particular, to a motor-position detecting method for detecting the axial position of a rotor provided in a brushless motor, as well as a motor driving unit and a pump equipped with the motor driving unit.

BACKGROUND ART

A brushless motor used in, for example, a canned motor pump etc., such as an artificial heart pump, is configured such that the rotor is not fixed in the axial direction but is supported by hydrodynamic bearings or a magnetic bearing without contact therewith so as to be movable in the axial direction. In this case, to determine whether the rotor is at an appropriate position and to adjust the position of the rotor in the axial direction, it is necessary to detect the axial position of the rotor.

A known example of the method for detecting the axial position of the rotor involves detecting the position of the rotor on the basis of signals from a standard displacement sensor (optical, eddy-current type, capacitance type, etc.).

For example, in a motor incorporated in an axial-flow artificial heart pump, configured such that the rotor interacts with fluid flowing in a support tube, and provided with a regulator having a sensor for detecting the axial motion of the rotor and at least one electromagnetic coil, a technology for preventing step-out etc. of the motor by adjusting the magnetic field of the magnetic coil with the regulator has been proposed (for example, refer to Patent Citation 1).

Patent Citation 1: Japanese Translation of PCT International Application, Publication No. 2003-525561

DISCLOSURE OF INVENTION

However, the above-described artificial heart pumps etc. are themselves small, so that the motor incorporated therein is also required to be small. Therefore, the above-described method for detecting the axial position of the rotor using a standard sensor has a problem in that miniaturization of the motor cannot be expected.

The present invention is made to solve the above problem, and it is an object thereof to provide a motor-position detecting method for detecting the axial position of a rotor without using a sensor, as well as a motor driving unit and a pump.

A first aspect of the present invention is a method for detecting the position of a motor including a rotor and a stator around which armature windings of a plurality of phases are wound, wherein a position detecting coil is disposed on one axial end face of a stator core, an induced voltage generated in the position detecting coil is detected, and the axial position of the rotor is detected on the basis of the detection result.

According to this aspect, since the position detecting coil is disposed on the one axial end face of the stator, the axial position of the rotor can easily be detected without using a standard sensor by detecting an induced voltage, according to the axial position of the rotor, generated in this position detecting coil.

In the motor-position detecting method, the position detecting coil may be further disposed on the other axial end face of the stator core, and the axial position of the rotor may be detected on the basis of the voltage difference between an induced voltage generated in the position detecting coil disposed in the one axial end face and an induced voltage generated in the position detecting coil disposed in the other axial end face.

Since the position detecting coil is disposed on both axial end faces of the stator core, and the axial position of the rotor is detected on the basis of the voltage difference between the induced voltages generated in both position detecting coils, the detection accuracy of the axial position of the rotor can be further improved.

In the above motor-position detecting method, it is preferable that when the number of magnetic poles of the rotor is N, the position detecting coil be disposed on substantially one N-th of the outer circumference of the stator core.

Thus, when the number of magnetic poles of the rotor is N, the position detecting coil is disposed on substantially one N-th of the outer circumference of the stator core as described above. This allows the induced voltage generated in the position detecting coil to be reliably detected. This can further improve the rotor-position detection accuracy.

In the motor-position detecting method, the position detecting coil may be integrally mounted on the stator core.

Since the position detecting coil is integrally mounted on the stator core, further space saving can be achieved.

A second aspect of the present invention is a method for detecting the position of a motor including a rotor and a stator around which armature windings of a plurality of phases are wound, wherein ends of a first tooth and a second tooth, in the axial direction of the rotor, around which armature windings of the same phase are wound are each formed of a nonmagnetic material, and the ends formed of the nonmagnetic material are asymmetrical between the first tooth and the second tooth, and the axial position of the rotor is detected on the basis of the difference between an induced voltage generated in the armature winding wound around the first tooth and an induced voltage generated in the armature winding wound around the second tooth.

According to this aspect, any two of the teeth around which the armature windings of the same phase are wound are selected as a first tooth and a second tooth, and the ends of the teeth in the axial direction of the rotor are formed of a nonmagnetic material. In this case, the ends formed of the nonmagnetic material are set asymmetrical between the first tooth and the second tooth. This allows the voltage induced in the armature winding wound around the first tooth and the voltage induced in the armature winding wound around the second tooth to be made different depending on the position of the rotational axis of the rotor. Accordingly, measuring the voltage difference between the induced voltage generated in the armature winding wound around the first tooth and the induced voltage wound around the second tooth allows the axial position of the rotor to be detected. This allows detection of the position of the rotor to be easily performed without providing a rotor-position detecting sensor. Moreover, since this can eliminate the need for the sensor, space saving can be expected.

In the above motor-position detecting method, it is preferable that the first tooth and the second tooth be opposed, with the central axis of the stator therebetween.

Selecting such teeth as the first tooth and the second tooth allows the voltage difference between the induced voltages to become apparent, thus improving the rotor-position detection accuracy.

A third aspect of the present invention is a unit for driving a motor including a rotor and a stator around which armature windings of a plurality of phases are wound, wherein an induced voltage generated in a position detecting coil disposed on one axial end face of the core of the stator is detected, and the axial position of the rotor is detected on the basis of the detected induced voltage.

A fourth aspect of the present invention is a unit for driving a motor including a rotor and a stator around which armature windings of a plurality of phases are wound, wherein ends of a first tooth and a second tooth, in the axial direction of the rotor, around which armature windings of the same phase are wound are each formed of a nonmagnetic material, and the ends formed of the nonmagnetic material are asymmetrical between the first tooth and the second tooth, and the axial position of the rotor is detected on the basis of the difference between an induced voltage generated in the armature winding wound around the first tooth and an induced voltage generated in the armature winding wound around the second tooth.

The motor-position detecting method and the motor driving unit of the present invention are suitable for application to various brushless motors. In particular, they are suitable for application to pumps that are required to be compact, for example, canned motor pumps, such as artificial heart pumps.

The above aspects can be used in combination, within the possible scope.

The present invention offers the advantage of allowing the axial position of the rotor to be detected without using a sensor.

BEST MODE FOR CARRYING OUT THE INVENTION

Embodiments of a motor-position detecting method, a motor driving unit, and a pump according to the present invention will be described hereinbelow with reference to the drawings.

First Embodiment

Figure 1:
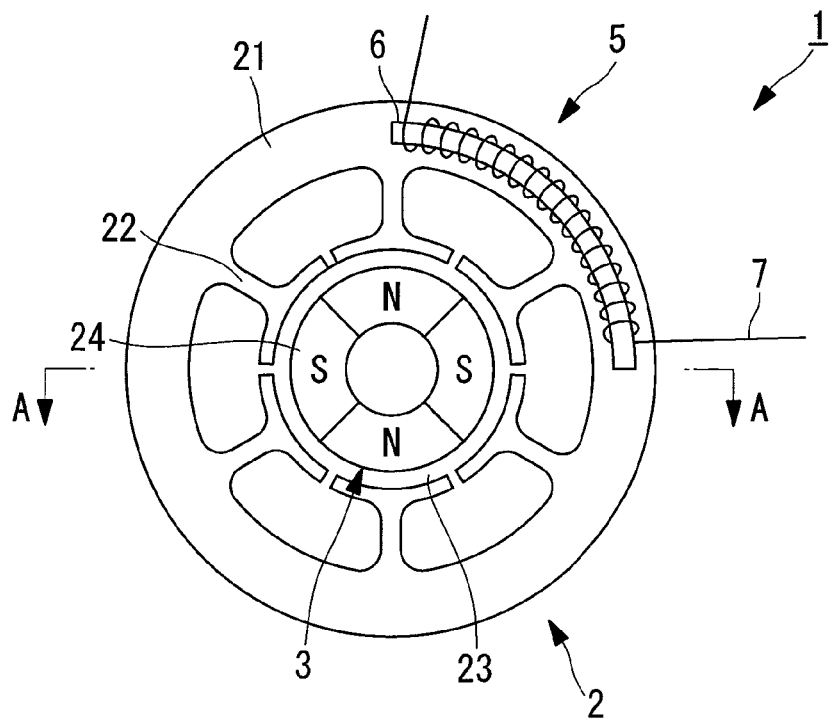
FIG. 1 is a sectional view of a three-phase brushless motor according to a first embodiment of the present invention.
Figure 2:
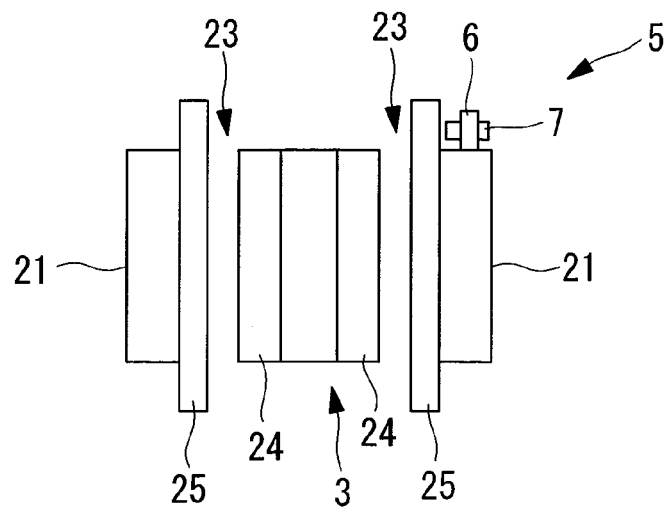
FIG. 2 is a sectional view of the brushless motor shown in FIG. 1, taken along arrows A-A.

FIG. 1 is a sectional view of a three-phase brushless motor (hereinafter, referred to as a motor) according to a first embodiment of the present invention; FIG. 2 is a sectional view of the motor 1 shown in FIG. 1, taken along arrows A-A; and FIG. 3 is a schematic perspective view of the motor for explaining an example of mounting of a position detecting coil.

Figure 3:
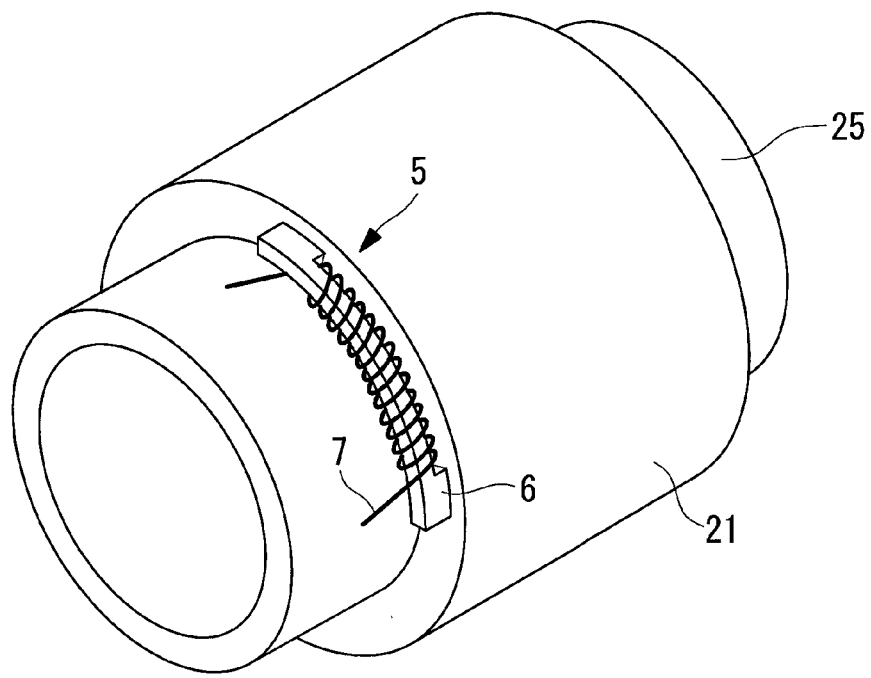
FIG. 3 is a schematic perspective view of the brushless motor for explaining an example of mounting of a position detecting coil.

The motor 1 shown in FIGS. 1 to 3 includes a stator 2 and a rotor 3. The stator 2 has a plurality of stator teeth 22 provided inside a cylindrical stator core 21 formed by laminating multiple thin magnetic steel plates at predetermined intervals in the circumferential direction. Y-connected three-phase armature windings 25 (see FIG. 2) are wound around the stator teeth 22.

The rotor 3, in which four-pole permanent magnets 24 are disposed in the circumferential direction, is rotatably disposed in the stator 2, with a predetermined air gap 23 therebetween. This embodiment shows a case in which the number of stator teeth=6, and the number of magnetic poles of the rotor 3=4; however, the number of stator teeth and the number of magnetic poles are not limited thereto and can be set as appropriate.

A position detecting coil 5 for detecting the axial position of the rotor 3 is provided on an axial end face of the stator core 21 of the stator 2. This position detecting coil 5 includes a thin iron core 6 provided, for example, on the axial end face of the stator core 21 in the circumferential direction thereof and a winding 7 wound around the iron core 6.

The length of the iron core 6 is not particularly limited; however, if the number of magnetic poles is N, it is preferably about one N-th of the perimeter of the stator core 21, that is, in this embodiment, about one fourth of the perimeter of the stator core 21. This allows magnetic flux to easily pass therethrough and larger induced voltage to be generated.

Figure 4:
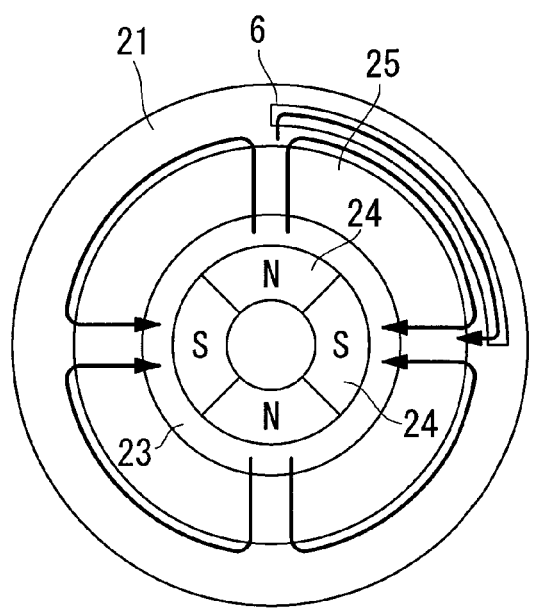
FIG. 4 is a diagram showing the magnetic flux loop of the brushless motor shown in FIG. 1.

As shown in FIG. 4, in the motor 1, magnetic flux exiting from the N poles of any permanent magnets 24 passes through the air gap 23 and passes through the air gap 23 again via the outer circumference of the windings wound around the stator teeth 22, and then returns to the S poles of the adjacent permanent magnets 24. The smaller the width of the air gap 23 is, the more effectively the magnetic flux generated from the permanent magnets 24 can be used.

Figure 5:
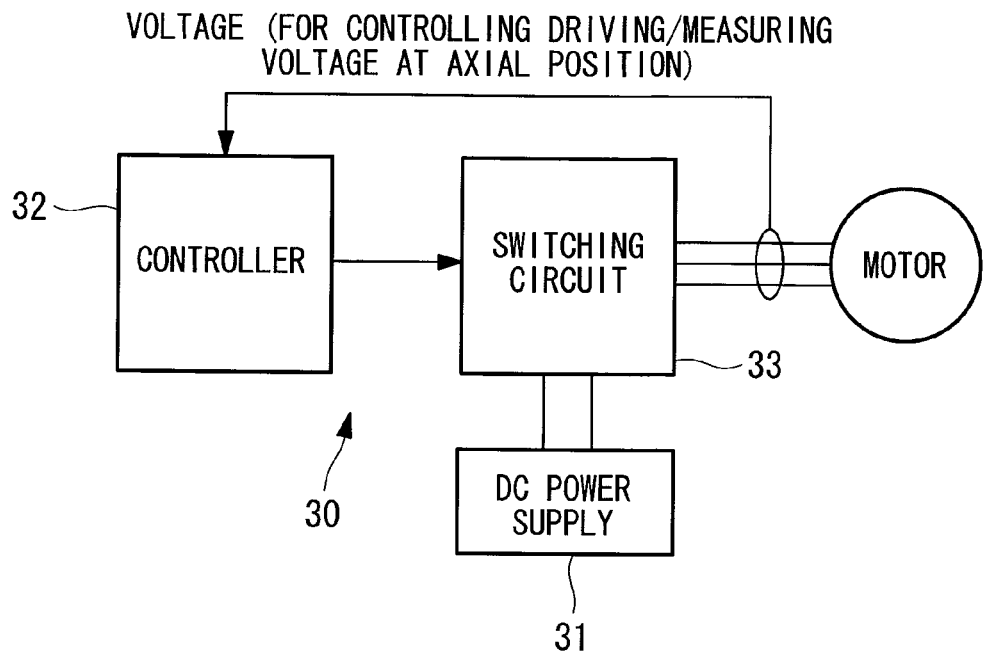
FIG. 5 is a schematic configuration diagram of a driving unit for the motor according to the first embodiment of the present invention.
Figure 6:
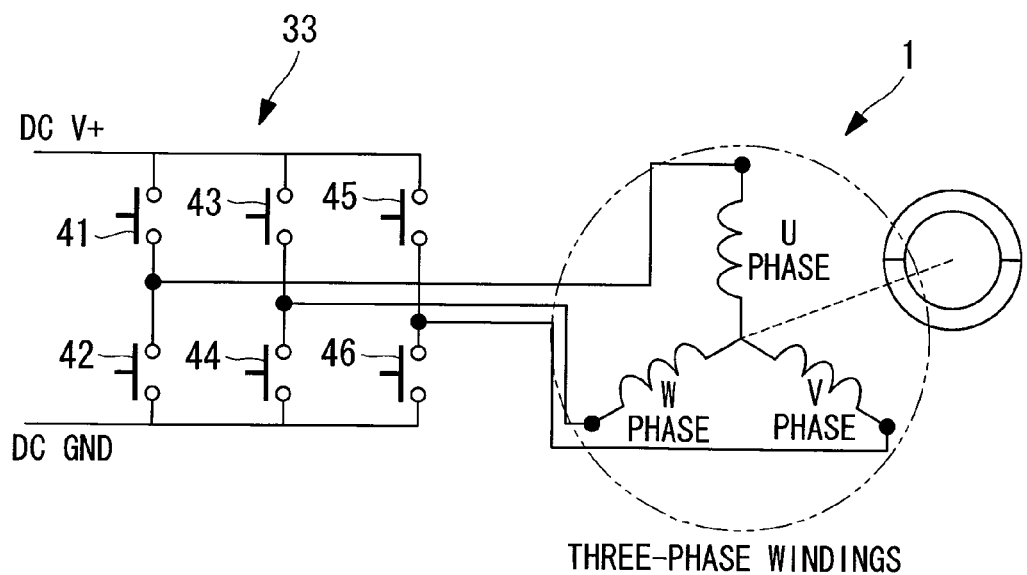
FIG. 6 is a schematic configuration diagram of a switching circuit shown in FIG. 5.

Next, a driving unit for the motor 1 will be described with reference to FIG. 5. FIG. 5 is a diagram showing, in outline, the overall configuration of the driving unit for the motor 1. As shown in FIG. 5, the motor driving unit 30 is equipped with a direct-current power supply 31, a controller 32, and a switching circuit 33. As shown in FIG. 6, the switching circuit 33 includes six three-phase-bridged switching elements 41 to 46.

Examples of the switching elements 41 to 46 include power transistors, IGBTs, and power FETs. The switching elements 41 to 46 are each connected to a power diode (not shown) in reverse parallel configuration.

The switching elements 41 to 46 perform switching operations in response to a control signal from the controller 32, for example, a PWM control signal, to supply power from the direct-current power supply 31 to the armature windings U, V, and W of individual phases of the motor 1. Specifically, of the switching elements 41 to 46, the switching elements 41 and 42 correspond to the U phase, to the node of which one end of the U-phase armature winding is connected.

The switching elements 43 and 44 correspond to the W phase, to the node of which one end of the W-phase armature winding is connected. The switching elements 45 and 46 correspond to the V phase, to the node of which one end of the V-phase armature winding is connected. The other ends of the armature windings of each phase are connected in common.

A voltage between both ends of the winding 7 that constitutes the position detecting coil 5, shown in FIGS. 1 to 3, is measured by a voltmeter (not shown) and is input to the controller 32. The controller 32 generates a PWM control signal on the basis of a required torque, a required rotational speed, or the like, supplies it to the switching circuit 33, and detects the axial position of the rotor 3 on the basis of the voltage between both ends of the position detecting coil 5.

Figure 7:
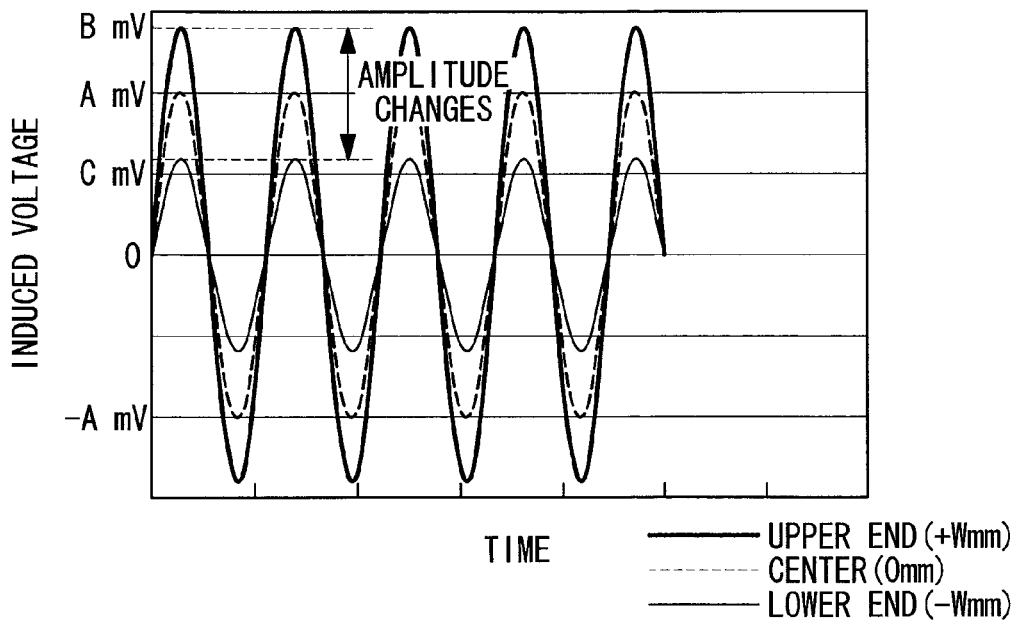
FIG. 7 is a diagram showing an example of changes in the amplitude of an induced voltage generated in the position detecting coil relative to the axial displacement of a rotor 3.

Next, referring to FIGS. 7 and 8, a function of the controller 32 for detecting the axial position of the rotor will be described. FIG. 7 is a diagram showing an example of the voltage between both ends of the winding 7 relative to the axial displacement of the rotor 3, that is, changes in the amplitude of an induced voltage VL generated in the position detecting coil 5; and FIG. 8 is a diagram showing the relationship between the axial position of the rotor 3 and the amplitude of the induced voltage VL.

In FIG. 7, the horizontal axis indicates time, and the vertical axis indicates the induced voltage. In FIG. 8, the horizontal axis indicates the axial position of the rotor (displacement from a reference position, in other words, displacement of the axial center of the rotor 3 relative to the axial center of the stator core 21), and the vertical axis indicates the amplitude of the induced voltage.

Figure 8:
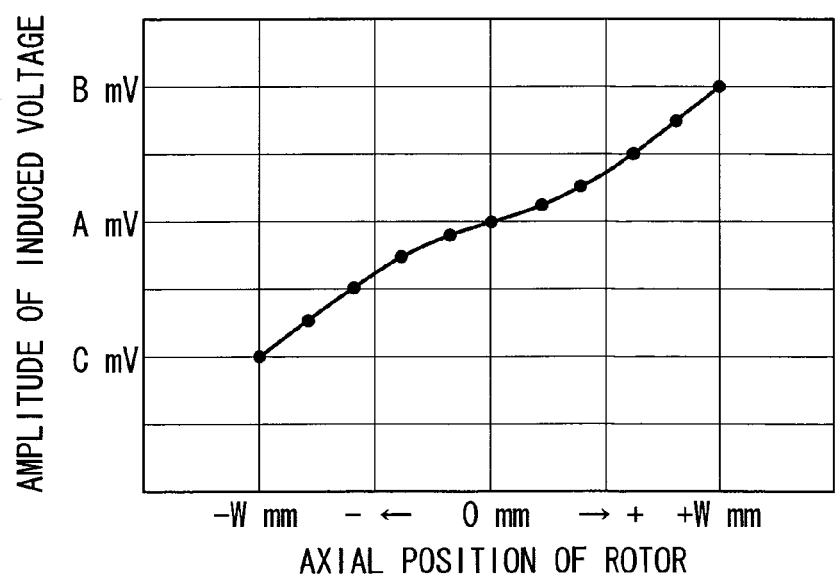
FIG. 8 is a diagram showing the relationship between the axial position of the rotor and the amplitude of the induced voltage.
Figure 9:
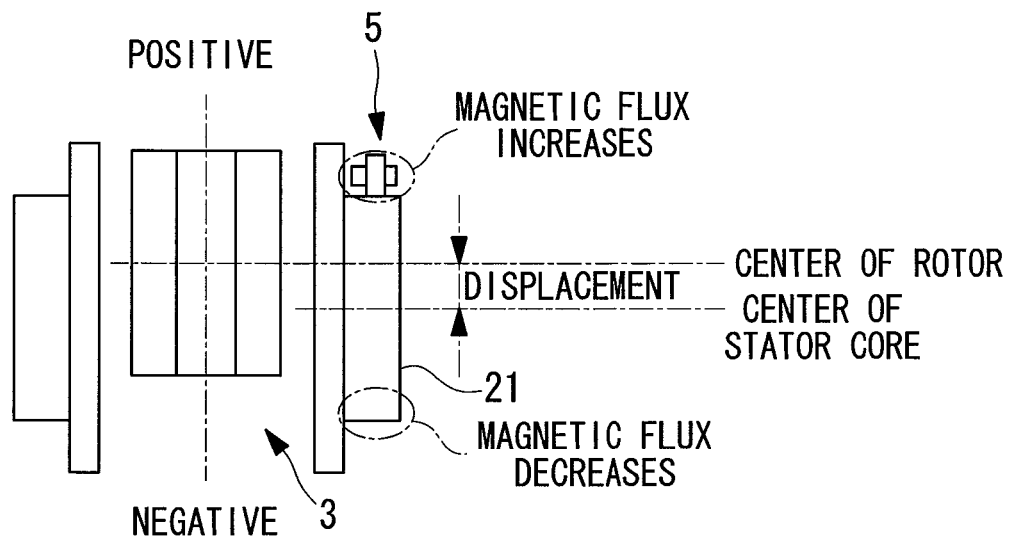
FIG. 9 is a diagram showing changes in magnetic flux generated in a stator core when the axial position of the rotor changes.

It is seen from FIGS. 7 and 8 that when the axial position of the rotor 3 changes, the amplitude of the induced voltage VL generated in the position detecting coil 5 changes. This is because, as shown in FIG. 9, when the axial position of the rotor 3 moves, the magnetic-flux density of the stator core 21 increases at the moving side and decreases at the opposite side.

That is, when the axial position of the rotor 3 moves toward a position where the position detecting coil 5 is disposed, the amplitude of the induced voltage VL generated in the position detecting coil 5 increases, and in contrast, when the position of the rotor 3 moves to a position where the position detecting coil 5 is not disposed, the amplitude of the induced voltage VL generated in the position detecting coil 5 decreases.

Thus, registering a table in which the axial position of the rotor 3 and the amplitude of the induced voltage VL are associated with each other, for example, the table shown in FIG. 8, in the controller 32 (see FIG. 5) in advance allows the axial position of the rotor 3 to be easily detected by finding the axial position of the rotor 3 corresponding to the amplitude of the induced voltage generated in the position detecting coil 5 during the driving of the motor 1 from the table shown in FIG. 8.

As has been described above, according to the motor-position detecting method and the motor driving unit according to this embodiment, the position detecting coil 5 is disposed on one axial end face of the stator core 21, and the axial position of the rotor 3 is detected on the basis of the induced voltage VL generated in the position detecting coil 5, which allows the axial position of the rotor 3 to be easily detected without using a sensor. Since the space in which the position detecting coil 5 is provided was originally a vacant space, the hitherto unused space can be used effectively.

Second Embodiment

Next, a second embodiment of the present invention will be described with reference to FIG. 10.

In the position detecting method and the motor driving unit according to the first embodiment described above, the position detecting coil 5 is disposed only on one axial end face of the stator core 21, whereas this embodiment is provided with position detecting coils 5 and 5' on both axial end faces of the stator core 21. Descriptions of commonalties between the position detecting method and the motor driving unit of this embodiment and those of the first embodiment will be omitted here and differences will be mainly described.

Figure 10:
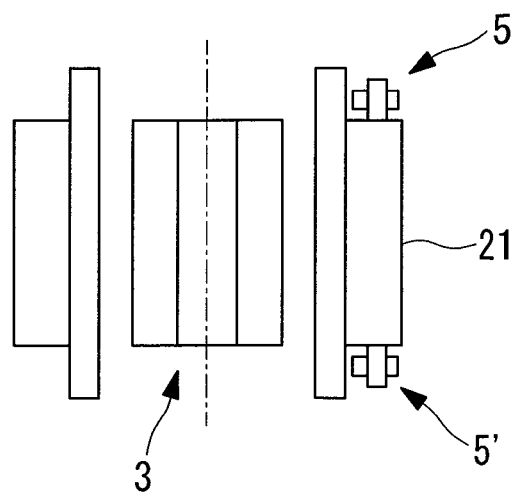
FIG. 10 is a diagram showing, in outline, the configuration of a motor according to a second embodiment of the present invention.
Figure 11:
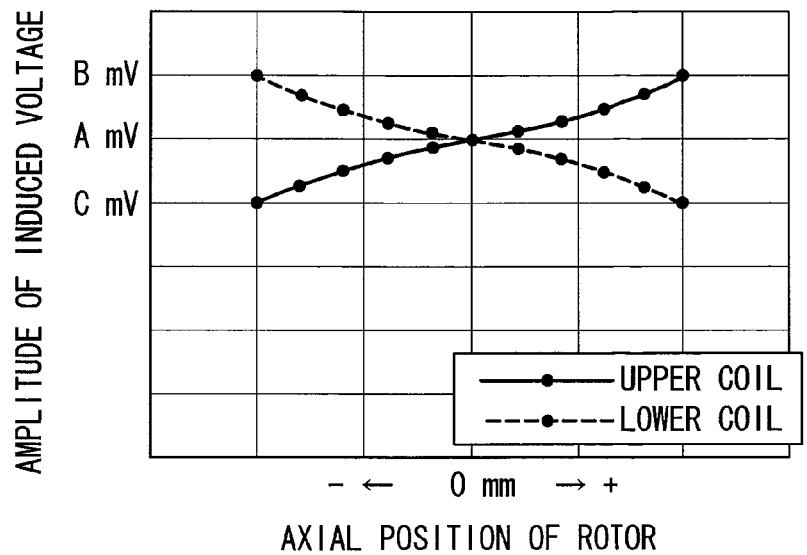
FIG. 11 is a diagram showing changes in the amplitude of an induced voltage relative to the axial displacement of a rotor in the motor shown in FIG. 10.

In the case where the position detecting coils 5 and 5' are disposed on both end faces of the stator core, as shown in FIG. 10, the induced voltage VL generated in the position detecting coil 5 and an induced voltage VL' generated in the position detecting coil 5' are symmetrical about the reference position of the rotor (a position at which the axial center of the stator core and the axial position of the rotor match), as shown in FIG. 11.

Figure 12:
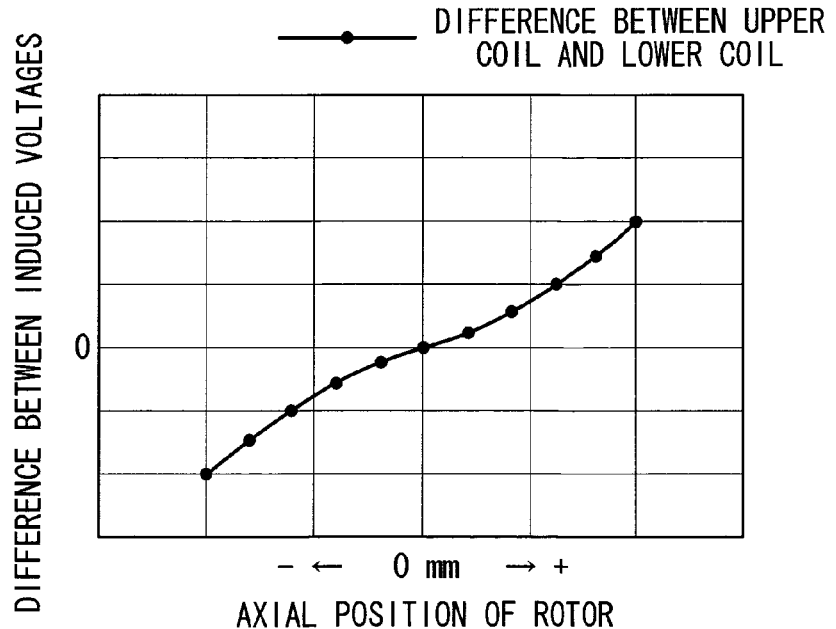
FIG. 12 is a diagram showing changes in the difference between induced voltages relative to the axial displacement of the rotor in the motor shown in FIG. 10.

Therefore, assuming that the induced voltage VL is positive, the voltage difference $\Delta V = VL - VL'$ between the induced voltages VL and VL' is zero at the reference position, takes a larger positive value $\Delta V = VL - (-VL') = VL + VL'$ as the rotor 3 moves toward the position detecting coil 5 side and, in contrast, and takes a larger negative value $\Delta V = -VL - (+VL') = -(VL+VL')$ as the rotor 3 moves toward a position where the position detecting coil 5 is not provided, as shown in FIG. 12.

Accordingly, in this embodiment, the axial position of the rotor is detected such that the relationship between the axial position of the rotor 3 and the voltage difference between the induced voltages VL and VL', as shown in FIG. 12, is stored in advance in the controller 32, and during the driving of the motor 1, the axial position of the rotor corresponding to the difference between the measurements of the induced voltages VL and VL' input from a voltmeter (not shown) is obtained from the table shown in FIG. 12.

As has been described above, according to the motor-position detecting method and the motor driving unit according to this embodiment, the position detecting coils 5 and 5' are provided on both axial end faces of the stator core 21, and the axial position of the rotor 3 is detected on the basis of the voltage difference $\Delta V$ between the induced voltages generated in the position detecting coils 5 and 5'. This can increase the detection sensitivity for the axial position of the rotor 3, thereby allowing the position detection accuracy to be further improved.

Furthermore, since the output at the central position is 0 V (0 volt), the central position and the direction of the displacement can be detected without reference to the table with the relationship between the position and the output voltage.

Third Embodiment

Next, a third embodiment of the present invention will be described with reference to FIG. 13.

In the motor-position detecting method and the motor driving unit according to the first embodiment described above, the axial position of the rotor 3 is detected by providing the position detecting coil 5 on one axial end face of the stator core 21; however, this embodiment detects the axial position of the rotor 3 by measuring an induced voltage generated in any of the U, V, and W phases.

Descriptions of commonalties between the motor-position detecting method and the motor driving unit of this embodiment and those of the first embodiment will be omitted here, and differences will be mainly described.

Figure 13:
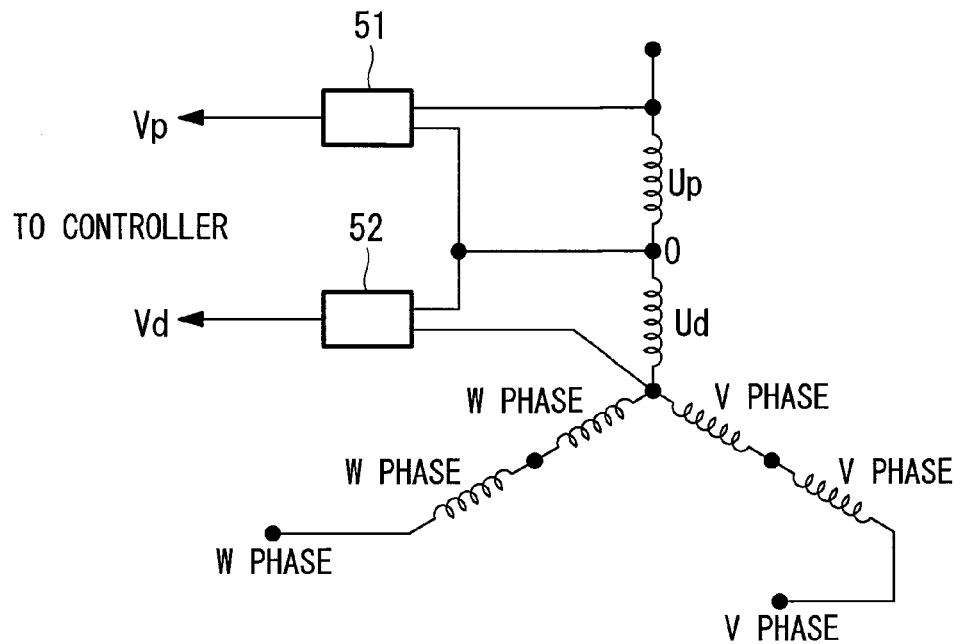
FIG. 13 is a diagram showing an example of the connection of armature windings according to a third embodiment of the present invention.
Figure 14:
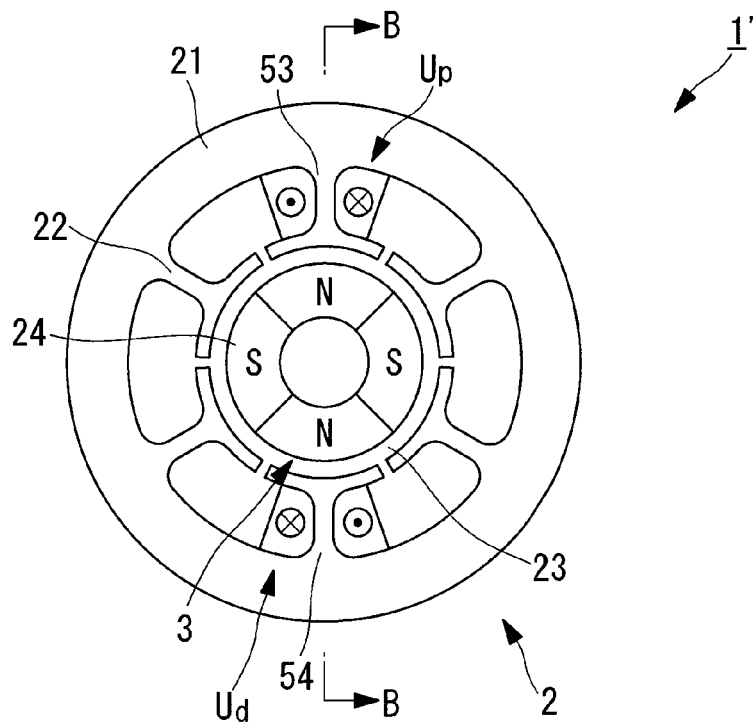
FIG. 14 is a cross-sectional view of a motor according to the third embodiment of the present invention.

FIG. 13 is a diagram showing an example of the connection of armature windings according to this embodiment; FIG. 14 is a cross-sectional view of a motor according to this embodiment; and FIG. 15 is a sectional view of the motor shown in FIG. 14, taken along arrows B-B.

Figure 15:
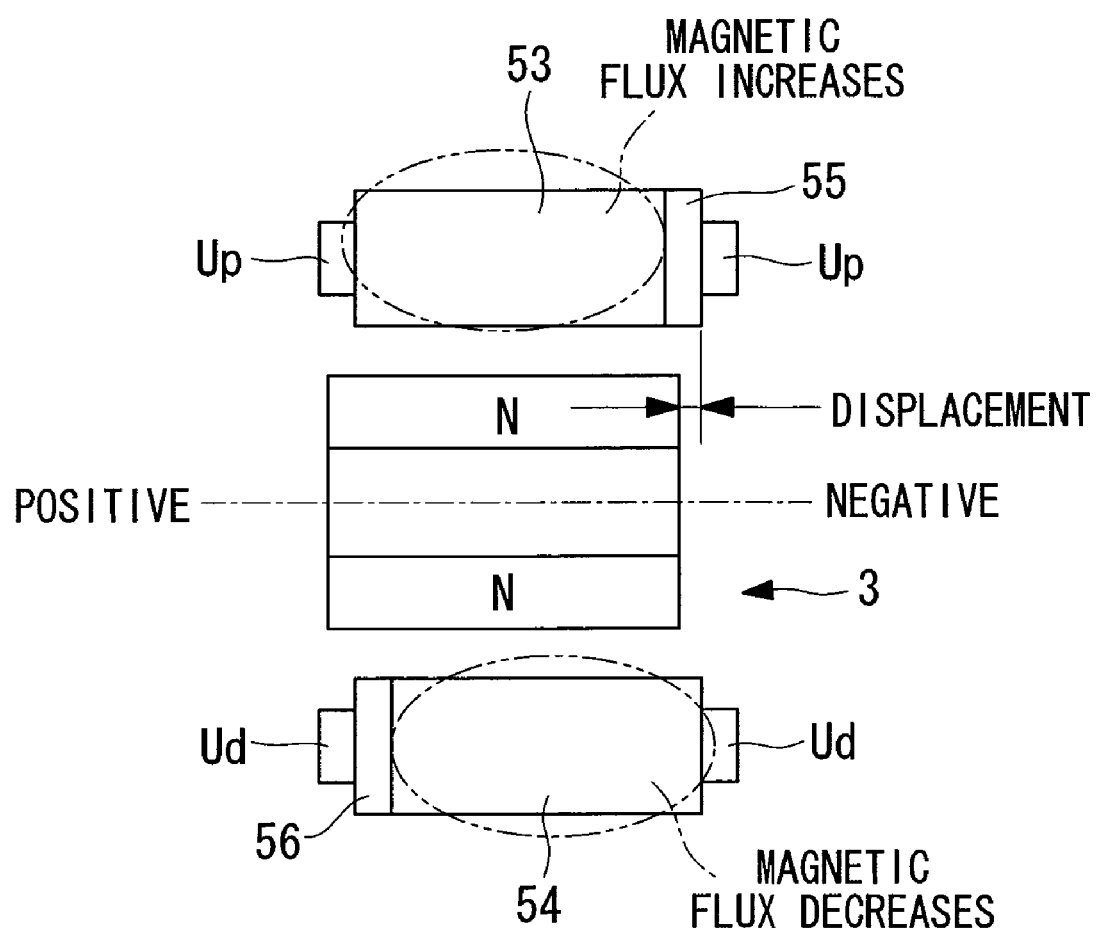
FIG. 15 is a sectional view of the motor shown in FIG. 14, taken along arrows B-B.

As shown in FIGS. 13 to 15, in this embodiment, one end 55 of a first tooth 53 in the axial direction of the rotor, around which part of a U-phase armature winding (upstream) Up is wound, is formed of a nonmagnetic material. Also, one end 56 of a second tooth 54 in the axial direction of the rotor, around which part of an armature winding (downstream) Ud in the same phase as the armature winding Up that is wound around the first tooth 53 is wound, is formed of a nonmagnetic material.

Here, the one ends 55 and 56 formed of a nonmagnetic material are asymmetrical between the first tooth 53 and the second tooth 54. Examples of the nonmagnetic material include resin, ceramic, aluminum, and copper.

As shown in FIGS. 13 and 14, an induced voltage Vp generated in the armature winding Up wound around the first tooth 53 is measured by a first voltmeter 51 and is output to the controller. An induced voltage Vd generated in the armature winding Ud wound around the second tooth 54 is measured by a second voltmeter 52 and is output to the controller.

The controller calculates the voltage difference ΔV' between the induced voltage Vp and the induced voltage Vd input from the first voltmeter 51 and the second voltmeter 52, respectively, and detects the axial position of the rotor 3 on the basis of the voltage difference ΔV'.

For example, as shown in FIG. 15, the direction in which the nonmagnetic material of the upstream teeth 53 is provided is defined as negative, and the direction in which the nonmagnetic material of the downstream teeth 54 is provided is defined as positive. In this case, induced voltages Vp and Vd according to the axial position of the rotor 3 are generated in the U-phase armature winding Up and the armature winding Ud, respectively.

Specifically, when the rotor 3 is rotating at the reference position, induced voltages Vp and Vd of equal magnitude are generated in the upper winding Up and the lower winding Ud, respectively. In contrast, when the rotor 3 moves to the positive side, the density of magnetic flux passing through the armature winding Ud decreases, decreasing the induced voltage Vd in the armature winding Ud, and in contrast, the density of magnetic flux passing through the armature winding Up increases, increasing the induced voltage Vp in the armature winding Up.

Figure 16:
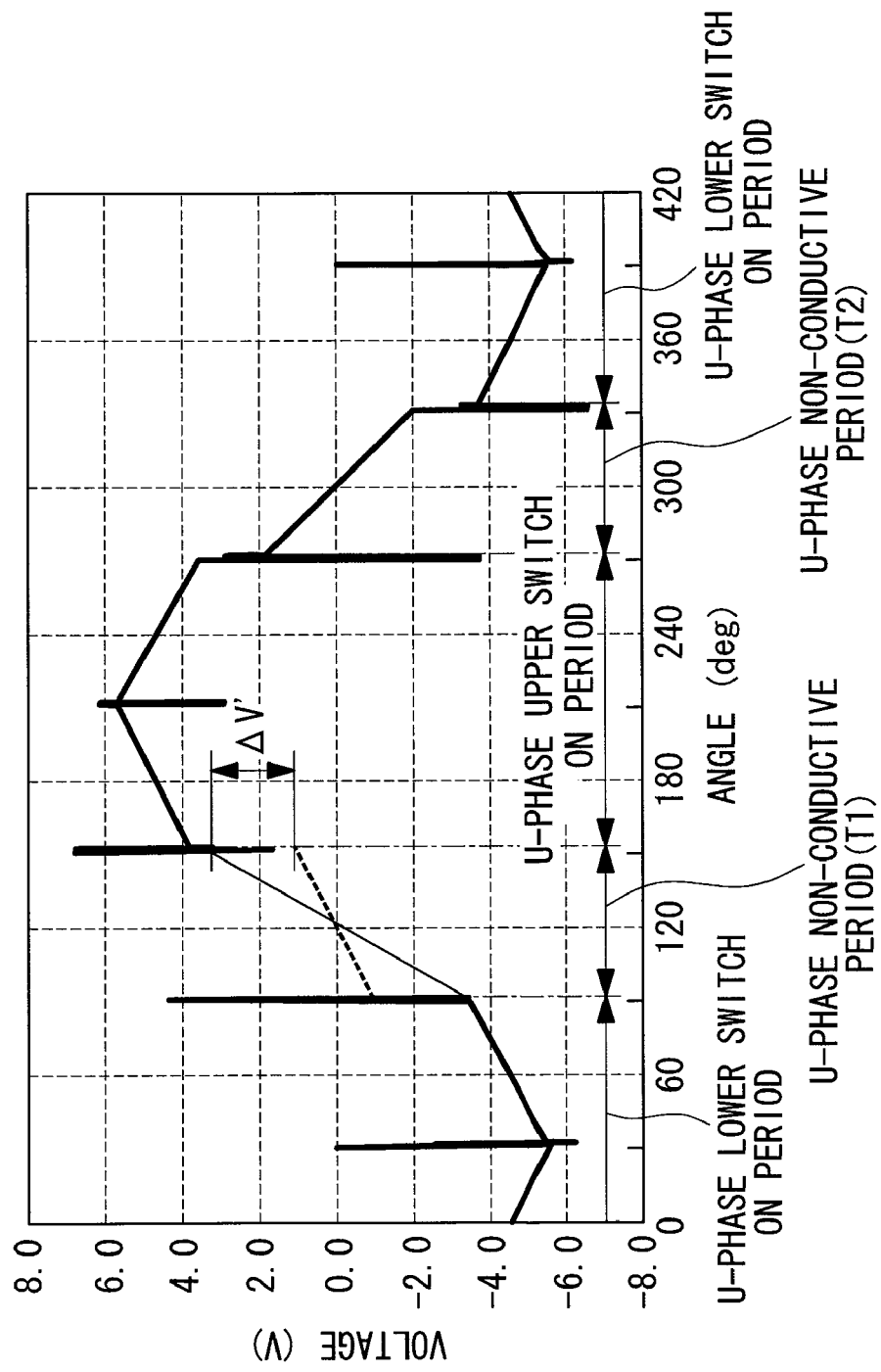
FIG. 16 is a diagram for explaining the relationship between the voltage difference between induced voltages generated in upstream and downstream armature windings during a U-phase non-conductive period during the driving of the motor and the axial position of the rotor.

It is preferable to measure the induced voltage generated in the U-phase during a period of time when both of the switching elements 41 and 42 (see FIG. 6) corresponding to the U-phase are off, that is, during the non-conductive period of the U-phase, in view of measuring accuracy. Therefore, as shown in FIG. 16, for example, when switching the switching elements 41 and 42 corresponding to the U-phase from OFF to ON, the controller finds the voltage difference ΔV' between the induced voltages Vp and Vd input from the first voltmeter 51 and the second voltmeter 52, respectively, and detects the position of the rotor 3 on the basis of the voltage difference ΔV'.

Specifically, as in the above-described second embodiment, the controller stores a table in advance in which the voltage difference ΔV' and the axial position of the rotor 3 are associated with each other and detects the axial position of the rotor 3 by extracting the axial position of the rotor corresponding to the voltage difference ΔV' from the table during the driving of the motor.

As has been described above, according to the motor-position detecting method and the motor driving unit according to this embodiment, the one ends 55 and 56 of the first tooth 53 and the second tooth 54 are made of a nonmagnetic material, and furthermore, the ends formed of the nonmagnetic material are asymmetrical; thus, when the rotor 3 moves in the axial direction, the induced voltage Vp generated in the armature winding Up wound around the first tooth 53 and the induced voltage Vd generated in the armature winding Ud wound around the second tooth 54 can be made different.

This allows the axial position of the rotor 3 to be detected on the basis of the voltage difference ΔV' between the induced voltage Vp generated in the armature winding Up and the induced voltage Vd generated in the armature winding Ud. As a result, the position of the rotor 3 can easily be detected without providing a position detecting sensor for the rotor 3, and space saving can be expected.

Note that, although this embodiment detects the position of the rotor 3 on the basis of the induced voltage generated in the U-phase, the position of the rotor may be detected on the basis of the induced voltage generated in the W-phase or V-phase instead of the U-phase.

Also, this embodiment has been described when applied to the case where six stator teeth are provided; alternatively, in a case where more stator teeth are provided, that is, in a case where windings of each phase are wound around three or more teeth, two teeth around which the same-phase armature windings are wound may be selected from the teeth as a first tooth and a second tooth, whose ends in the axial direction of the rotor may be formed of a nonmagnetic material so as to be asymmetrical, and the axial position of the rotor 3 may be detected from the difference between induced voltages generated in the armature windings wound around the teeth.

Also, in a case where the number of stator teeth around which armature windings of each phase are wound is even, two teeth that are opposed, with the central axis of the stator in between, should be selected as a first tooth and a second tooth. This can improve the position detecting accuracy.

The invention claimed is:
1. A method for detecting a position of a motor including a rotor and a stator around which armature windings of a plurality of phases are wound, wherein
a first end of a first tooth and a first end of a second tooth in an axial direction of the rotor, around which armature windings of a same phase are wound are formed of a nonmagnetic material, and the first ends formed of the nonmagnetic material are asymmetrical between the first tooth and the second tooth, the method comprises detecting an axial position of the rotor based on a difference between a first induced voltage generated in the armature windings wound around the first tooth and a second induced voltage generated in the armature windings wound around the second tooth.

2. The method according to claim 1, wherein the first tooth and the second tooth are opposed, with a central axis of the stator therebetween.

3. A unit for driving a motor including a rotor and a stator around which armature windings of a plurality of phases are wound, wherein a first end of a first tooth and a first end of a second tooth in an axial direction of the rotor, around which armature windings of a same phase are wound are formed of a nonmagnetic material, and the first ends formed of the nonmagnetic material are asymmetrical between the first tooth and the second tooth, the unit comprises a position detector configured to detect an axial position of the rotor based on a difference between a first induced voltage generated in the armature windings wound around the first tooth and a second induced voltage generated in the armature windings wound around the second tooth.

4. A pump comprising the unit for driving the motor according to claim 3.

* * * * *